2 Sheets—Sheet 1.
J. S. CAMPBELL.
DENTAL ENGINE.
No. 11,376. Reissued Oct. 17, 1893.
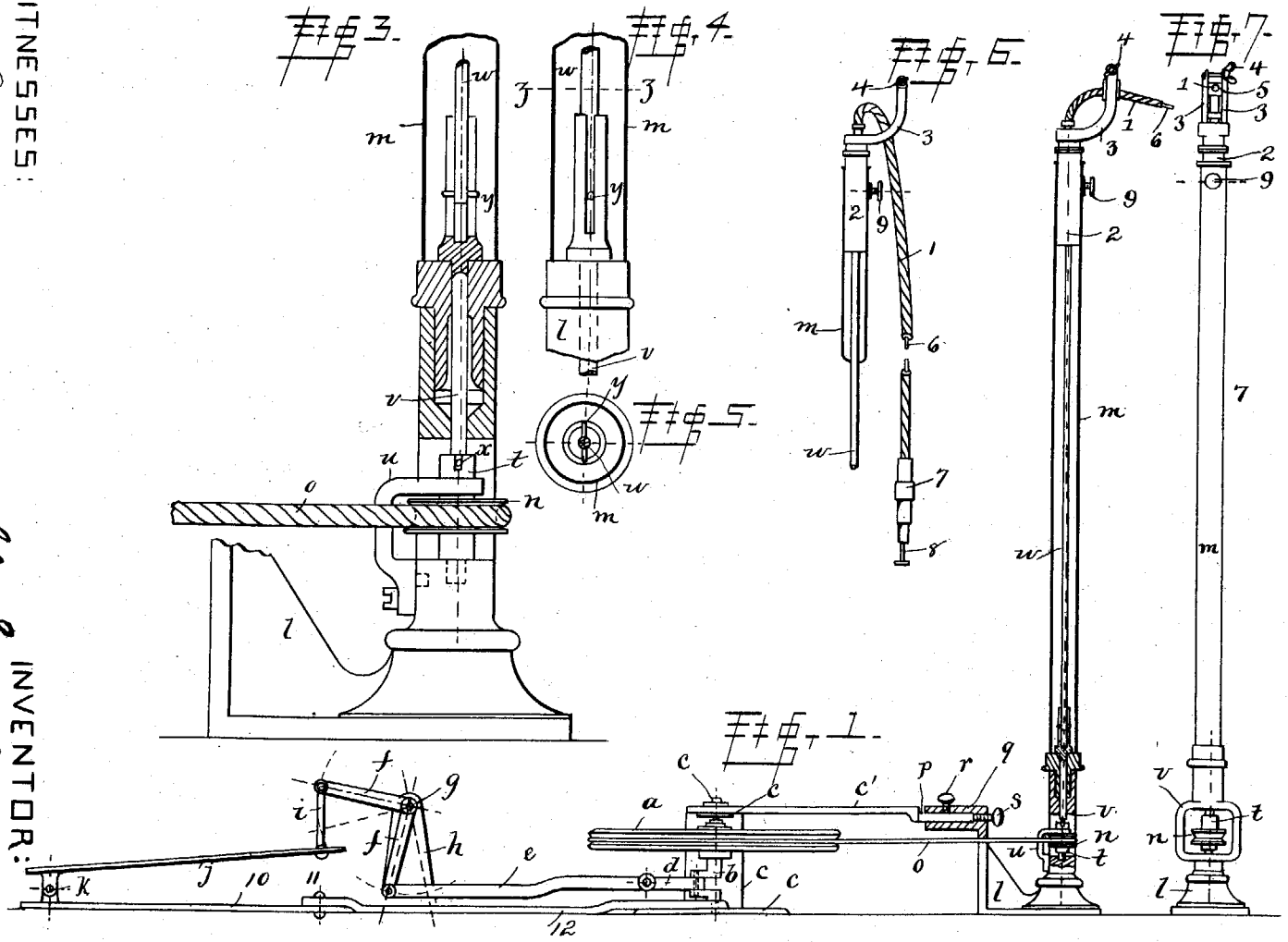
WITNESSES:
W. E. Bowen
Benj. Miller
INVENTOR:
John Smalley Campbell,
By J. E. Bowen
Attorney.

2 Sheets—Sheet 2.
J. S. CAMPBELL.
DENTAL ENGINE.
No. 11,376. Reissued Oct. 17, 1893.
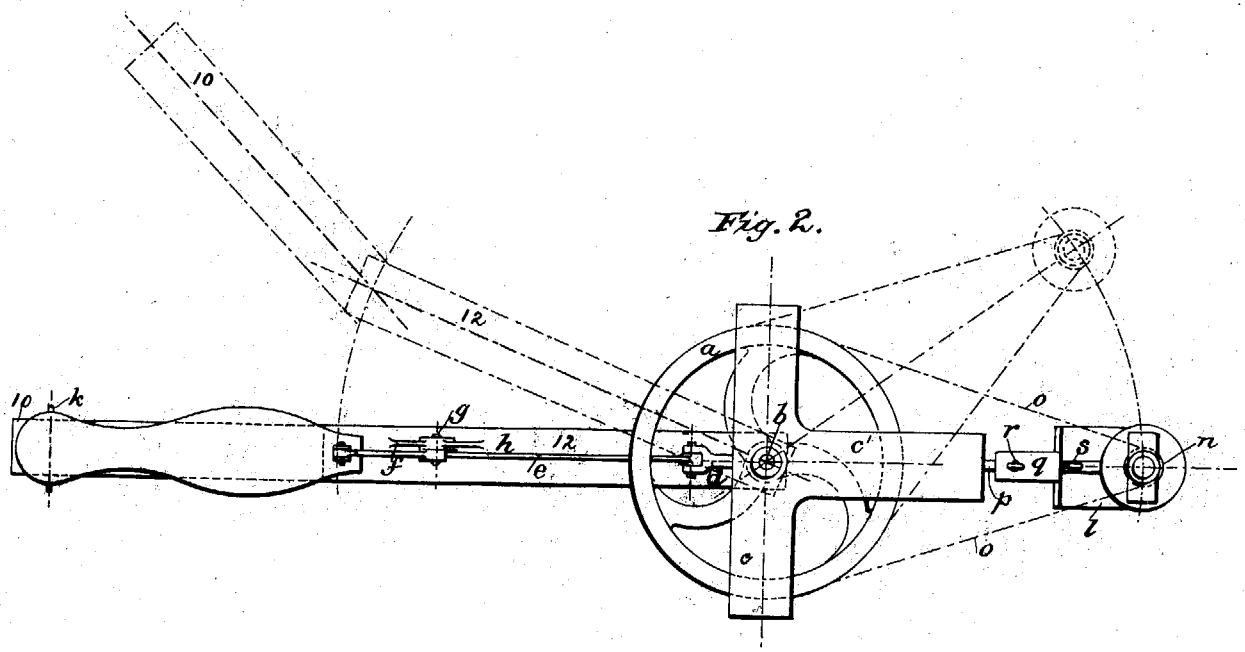
Witnesses:
L. C. Hills.
Alfred T. Gage
Inventor:
John Smalley Campbell,
By J. E. Ellis Bonn
Attorney.

UNITED STATES PATENT OFFICE.

JOHN SMALLEY CAMPBELL, OF LONDON, ENGLAND, ASSIGNOR TO EDWARD A. PIERCE, OF NEW YORK, J. OTIS COX, OF BROOKLYN, AND THE CARROLL ALUMINUM MANUFACTURING COMPANY, OF NEW YORK, N. Y.

DENTAL ENGINE.

SPECIFICATION forming part of Reissued Letters Patent No. 11,376, dated October 17, 1893.

Original No. 397,169, dated February 5, 1889. Application for reissue filed December 17, 1889. Serial No. 334,124. Patented in England March 26, 1888, No. 4,574, and in France May 31, 1888, No. 190,926.

*To all whom it may concern:*

Be it known that I, JOHN SMALLEY CAMPBELL, dentist, a citizen of the United States, residing at present at 10 Park Square, West, Regents Park, Northwest, London, England, have invented certain new and useful Improvements in Dental Engines, (patented in Great Britain, No. 4,574, dated March 26, 1888, and in France, No. 190,926, dated May 31, 1888;) and I do hereby declare that the following is a full, clear, and exact description of the invention, which will enable others skilled in the art to which it appertains to make and use the same.

My improvements refer to that class of dental engines which are operated by the foot of the dentist. The engine to which I refer more particularly is composed of a vertical stand or frame onto which is fitted, on a horizontal crank-shaft, a fly-wheel or driving-wheel operated from a treadle and imparting rotary motion by means of a cord to a pulley on an axis at the top of the frame. The said axis is connected to the dental tool by a spiral spring, which transmits the rotary motion to the said tool.

My object is to improve this class of engines with a view of dissimulating most of its bulky parts under the foot-board of a dental chair, so as to conceal them to a great extent from the eyes of the patient.

My invention embodies a horizontally-supported main driving-wheel which with its supporting frame is adapted to be entirely concealed under the foot-board of a dental-chair, a base for the support of the tool-carrying standard, and a pedal-mechanism, the said pedal-mechanism being pivotally connected to the supporting frame of the main driving-wheel, so that the pedal may be adjusted around the dental-chair, (and hence around the driving-wheel beneath the chair,) and the base of the tool-carrying standard connected to a horizontally projecting part of the support for the driving-wheel. By thus connecting the three main elements of the engine, viz: the horizontally-supported main driving-wheel, the base of the tool-carrying standard, and the pedal-mechanism, the pedal-mechanism is not only capable of being adjusted in the manner stated, but the entire engine-structure may be folded together when storing or transporting the same.

My invention accordingly consists in the combination of a horizontally-supported main driving-wheel, a base supporting a tool-carrying standard, and a pedal-mechanism, the pedal and wheel-supporting frame (to which frame is attached the base of the tool-carrying standard) being pivotally connected together to permit of the angular adjustment of the pedal, and also to admit of the folding together of the entire engine-structure when storing or transporting the same.

The invention further consists in certain combinations of elements, as specified in the claims.

In the accompanying drawings, Figure 1 is a side elevation of the improved engine, partly in section. Fig. 2 is a top view, and Figs. 3, 4, 5, 6, and 7 are detail views.

*a* is the main-driving-wheel, fast on a vertical crank-shaft, *b*, fitted in suitable bearings on the frame *c*. The crank of the shaft *b* is connected by links *d e* to a bell-crank lever, *f*, fitted onto an axis, *g*, secured to an arm, *h*. The bell-crank lever *f* is connected by a link, *i* to the pedal, *j*, pivoted at *k*.

*l* is the base or frame for the tool-carrying standard *m*. The base *l* carries a pulley, *n*, to which the rotary motion of the wheel *a* is imparted by a cord, *o*.

As shown in the drawings the connection between base *l* and vertical axis-supporting frame *c* consists of a bar *c'* projecting horizontally from said frame while its outer end is connected to base *l* as shown. The connection between base *l* and bar *c'* is such as to permit of the adjustment of the base toward or away from the driving-wheel so that the tension on the driving-cord *o* may be regulated at will. The adjustment herein shown is composed of a part, *p*, at the end of bar *c'*, held in a socket, *q*, by means of a set-screw, *r*, the requisite tightening of the cord *o* being obtained by a screw, *s*.

The pulley *n* is fast on an axis, *t*, the lower end of which rests in a socket of the base *l*, while the upper end is held by a bracket, *u*, fastened to the said base *l*, as shown in Fig. 3, which, together with Figs. 4 and 5, is on a larger scale than Figs. 1 and 2, the object of which construction is to permit a continuous driving-cord to be placed onto the pulley *n*.

The upper end of the axis *t* is hollowed out and slotted for receiving the lower end of the axis *v*, the top portion of which is tubular and slotted for receiving the end of the internal rod or shaft, *w*. The connection between the bottom end of the axis *v* and the top end of the axis *t* is effected by means of a cross-pin, *x*. The connection between the lower end of the rod *w* and the top end of the axis *v* is likewise effected by means of a cross-pin, *y*, Figs. 3, 4, and 5; Fig. 5 being a cross-section of Fig. 4 on the line *z z*.

The internal rod, *w*, extends upward to the spiral spring, which is inside an ordinary sheathing, 1, the rod *w* and spring being connected in any known manner. The rod *w* is held in a tube, 2, the upper end of which terminates in a curved bracket composed of two cheeks, 3 3, united at the top by a set-screw or thumb-screw, 4. The space between the two cheeks 3 3 is for allowing the free passage of a slide-piece, 5, provided with a central hole for the sheathing 1. The spiral spring (shown at 6, Fig. 6) is connected by an ordinary hand-piece, 7, to a dental tool, 8. By means of this standard the operator is enabled to set the sheathing 1 in the most convenient position for his work by simply slackening the thumb-screw 4, setting the slide-piece 5, and then tightening the said screw. Moreover, this construction enables the sheathing 1 to be set almost parallel to the standard, (see Fig. 6,) thus affording every facility for folding the engine in case it requires to be carried.

The standard can be set at any suitable height for the operator by raising the tube 2 and parts thereto attached, and then setting by means of a screw, 9. In rising, the tube 2 carries with it the rod *w*, which then slides at its lower end out of the tubular portion of the axis *v* without, however, being put out of gear therewith. Moreover, the entire standard may be taken out of its socket in the base *l* by simply raising it by hand, the connection between the lower end of the axis *v* and the axis *t* being such as to enable this motion to take place.

The treadle is fitted on a bar, 10, connected by a pivot, 11, to a second bar, 12, connected in its turn with the frame *c* by another pivot, which in this case is the lower end of the crank-shaft *b*. By this construction the treadle and its bar 10 may be folded against bar 12 and the whole folded against the frame or bar connecting the main-driving-wheel, *a* to base *l*. On the other hand, the base *l*, with its standard, is likewise pivotally connected to the remainder of the engine by means of the horizontal bar *c'*, projecting from frame *c* as shown. The engine is thus composed of three principal elements; and the pivotal connection between the pedal-mechanism and the frame supporting the horizontal driving-wheel—to an horizontal extension of which frame the base of the tool-carrying standard is attached, as shown—enables the base of the tool-carrying standard and treadle to assume angular positions to each other, as shown in dotted lines in Fig. 2.

In practice the whole engine forms one whole device, of which the driving-wheel *a* and attached parts are entirely concealed under the foot-board of a dental chair; and as to the bar *c'* and base *l* they are mostly concealed at one side of the chair, and the treadle *j* mostly at the other side.

Having now described my improvements, I wish it to be clearly understood that the standard *m*, can be replaced by any other standard known without otherwise taking away any of the characteristics of the dental engine. I wish it also to be understood that if it is not desired to have a stand adjustable in height the ordinary stands of the well-known Shaw and S. S. White engines can be substituted. In this case the driving-cord would reach up to the top of the stand and pass over a pulley after first passing over a couple of pulleys placed in the same horizontal plane as the driving-wheel *a*.

I claim—

1. In a dental-engine, the combination with a horizontally-supporting main driving-wheel and its frame adapted to be located beneath the foot-board of a dental-chair, of a tool-carrying standard, a supporting base therefor attached to said wheel-supporting frame, and a pedal-mechanism, the said pedal and wheel-supporting frame pivotally connected together to permit of the angular adjustment of the pedal, substantially as set forth.

2. In a dental-engine, the combination with the main driving-wheel and a frame supporting the same horizontally near the floor, of the base of the tool-carrying standard connected to the driving-wheel support and a jointed treadle-mechanism pivotally connected to said support, substantially as set forth.

3. In a dental-engine, a horizontal main driving-wheel, a frame supporting the same provided with a horizontally-projecting bar, as *c'*, a tool-carrying standard and its base connected to the wheel-frame, substantially as set forth.

4. In combination with a dental engine, a treadle *j*, connected with the crank of the driving-wheel *a* and centered on the free end of a bar, 10, pivoted to a bar, 12, which is itself pivoted to the axis of said driving-wheel, all as and for the purposes set forth.

5. In a dental engine, a horizontal driving-wheel, *a* fitted in a frame, *c*, the axis of said wheel being adjustably connected to a base *l*—carrying a suitable standard—, in combination with treadle *j* centered on pivoted bar 10, pivoted bar 12, and gearing *i f e d*, substantially as set forth.

6. A dental engine having its main driving-wheel placed horizontally on a short vertical axis near the floor, said wheel being operated by a treadle fulcrumed on a base-bar, 10, pivoted to a bar, 12, pivoted on the axis of said wheel, substantially as shown and described.

7. The combination in a dental engine of frame *c* and base *l* adjustably connected as explained, with a suitable standard, a treadle, *j*, driving-wheel *a*, pulley *n*, and cord, substantially as shown and described.

8. The combination of an extensible standard consisting of an adjustable base, *l*, pulley, *n*, axis *t*, axis *v*, rod *w*, tube *m*, sliding tube 2, cheeks 3 3, set-screw 9, spring 6, and sheathing 1, with an adjustable frame, *c*, horizontal driving-wheel *a*, treadle *j*, and gears *i f e d b*, all substantially as shown and described.

9. A standard for the spring provided with an adjustable spring-supporter held between two cheeks, 3 3, and provided with a screw, 4, whereby it may be adjusted up or down, substantially as shown and described.

In witness whereof I have hereunto set my hand this 21st day of November, 1889.

JOHN SMALLEY CAMPBELL.

Witnesses:
HUGO KOELKER,
J. E. M. BOWEN.